United States Patent [19]
Takimoto et al.

[11] Patent Number: 5,247,598
[45] Date of Patent: Sep. 21, 1993

[54] REINFORCING APPARATUS FOR OPTICAL-FIBER COUPLER

[75] Inventors: Hiroaki Takimoto; Tomoyuki Hattori; Hiroshi Suganuma; Junichi Yoshikawa, all of Kanagawa; Kazuhiko Arimoto, Tokyo, all of Japan

[73] Assignees: Sumitomo Electric Industries, Ltd., Osaka; Sumiden Opcom, Ltd., Tokyo, both of Japan

[21] Appl. No.: 875,284

[22] Filed: Apr. 29, 1992

[30] Foreign Application Priority Data

Oct. 17, 1991 [JP] Japan ................ 3-269572

[51] Int. Cl.⁵ ................ G02B 6/00; G02B 6/36
[52] U.S. Cl. ................................................ 385/99
[58] Field of Search ................................ 385/95–99

[56] References Cited

U.S. PATENT DOCUMENTS

| | | | |
|---|---|---|---|
| 4,109,369 | 8/1978 | Taylor | 385/99 X |
| 4,227,951 | 10/1980 | Mignien | 385/99 X |
| 4,254,865 | 3/1981 | Pacey et al. | 385/99 |
| 4,714,316 | 12/1987 | Moore et al. | 385/99 X |
| 4,773,728 | 9/1988 | Kershaw | 385/99 |
| 4,778,242 | 10/1988 | Ota et al. | 385/99 X |
| 4,818,055 | 4/1989 | Patterson | 385/99 X |
| 4,863,234 | 9/1989 | Gladenbeck et al. | 385/99 |

FOREIGN PATENT DOCUMENTS

| | | |
|---|---|---|
| 0106116 | 4/1984 | European Pat. Off. . |
| 0357429 | 3/1990 | European Pat. Off. . |
| 0422445 | 4/1991 | European Pat. Off. . |
| 0151065 | 1/1984 | France . |
| 62-73210 | 4/1987 | Japan . |
| 63-271208 | 11/1988 | Japan . |
| 1-63907 | 3/1989 | Japan . |
| 2-29008 | 2/1990 | Japan . |

*Primary Examiner*—Akm E. Ullah
*Attorney, Agent, or Firm*—Cushman, Darby & Cushman

[57] ABSTRACT

A reinforcing apparatus for an optical-fiber coupler is formed by placing fused optical fibers into a grooved U-shaped base structure. A cover which has a different longitudinal length than the base structure is centered on top of the U-shaped base structure. There exists an exposed groove section of the U-shaped base structure which lies on either side of the cover. An adhesive is inserted into these exposed groove sections so as to fix the reinforcing casing and the optical-fiber coupler to each other.

30 Claims, 5 Drawing Sheets

REINFORCING APPARATUS FOR OPTICAL-FIBER COUPLER

BACKGROUND OF THE INVENTION

An optical-fiber coupler is an important fiber optic element for communication systems and sensor systems which use light waves. In an optical fiber coupler, light is propagated through a fiber core and is radiated into a cladding or distribution-coupler so as to distribute at a predetermined degree of coupling to thereby enclose the light in the core again.

One way to make an optical-fiber coupler is to arrange two optical fibers in parallel with an unsheathed section of each fiber touching. A heat source, such as a gas flame, is applied to the center of the fibers until the fibers fuse together. While the fibers are still malleable, they are drawn out in the longitudinal direction to make a thin tapered portion of fiber. This tapered portion has an average outer diameter of about 30 μm, which can be easily broken.

An apparatus is needed to reinforce and protect the thin tapered portion. Japanese Utility Model Unexamined Publication No. Hei-2-29008 and in Japanese Patent Unexamined Publication No. Sho-63-271208 describe reinforcing apparatuses.

An example of a conventional reinforcing apparatus is shown in FIG. 11 (prior art). After the fibers have been drawn out, an adhesive (2) is applied on both sides of the thin tapered portion. Then the optical-fiber coupler is sandwiched between two flat plates (3) to form a conventional reinforcing apparatus. This simple design is a weak structure because the plates do not form a solid case. Therefore, the plates can vibrate and allow the fibers to twist. Also, the thin tapered portion is exposed to the atmosphere where dust, dirt, smoke, etc., can attach to the optical-fiber coupler to cause leakage of light.

Another reinforcing apparatus which is slightly better is shown in FIG. 12 (prior art). A glass tube (4) is used to reinforce the optical-fiber coupler by applying the adhesive (2) to the optical fibers (1) and securing the coupler to the glass. This is a stronger apparatus than the design shown in FIG. 11 (prior art), but it is difficult to apply the adhesive to the optical coupler while it is in the glass tube (4). this structure also allows the thin tapered portion to be in contact with the atmosphere.

One solution is to make an apparatus shown in FIG. 13 (prior art). The optical-fiber coupler is housed in groove portion of the U-shaped base (5). An adhesive (2) is applied on each side of the thin tapered portion of the optical-fiber coupler and the cover (6) is placed on over the groove portion of the U-shaped base (5). The adhesive (2) holds the cover in place. The advantage of this reinforcing apparatus is that the thin tapered portion of the coupler is completely sealed within the reinforcing apparatus keeping all atmospheric dust away from the exposed fused fibers. The disadvantage is that assembling the apparatus can be troublesome.

SUMMARY OF THE INVENTION

In view of that disadvantage, it is an object of the present invention to provide a reinforcing apparatus for an optical fiber-coupler which has a simple structure and is easy and inexpensive to assemble when using an adhesive.

As specifically described with respect to the embodiments, the present invention, according to the presently preferred embodiment, is to have a U-shaped base member which forms a groove. The cover is smaller than the channel length which leaves, when viewed from the top, exposed groove sections on either side of the cover. Adhesive is then applied at these exposed groove sections to bond together the optical fibers, the U-shaped base and the cover. This reinforcing apparatus is easy to manufacture and the cost is low. When the casing has been previously manufactured, assembling the optical-fiber coupler with the reinforcing structure is extremely easy. The reinforcing structure that has an open portion on each end results in an improvement in work efficiency.

Accordingly, when the mold casing is set in manufacturing the optical-fiber coupler, the cover and the groove-formed portion can be set at the same time unlike the conventional case, and therefore automatization can be realized more preferably than the conventional case, so that the cost of the optical-fiber coupler can be reduced.

DETAILED DESCRIPTION OF THE INVENTION

The reinforcing apparatus for an optical-fiber coupler according to the preferred embodiment of the present invention will be described with reference to the accompanying drawings.

Figure 1A:
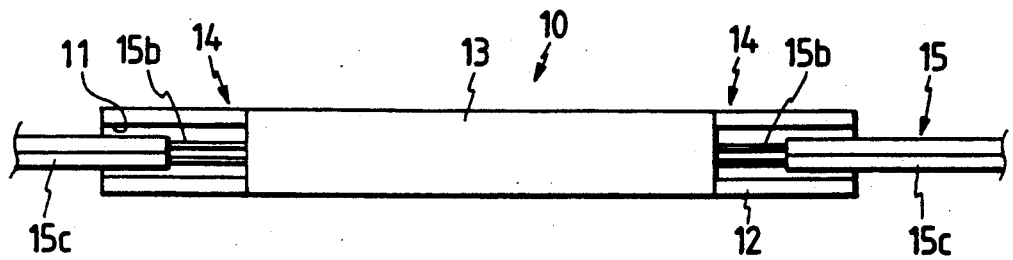
FIGS. 1(a), 1(b) and 1(c) are a schematic view of the reinforcing structure according to an embodiment of the present invention.
Figure 1B:
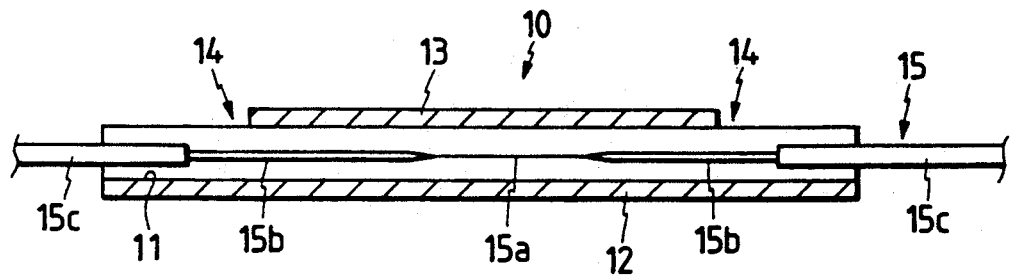
Figure 1C:
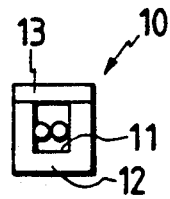

As shown in FIG. 1, the reinforcing apparatus (10) is made of two parts: a top cover (13) and a U-shaped bottom piece (12). The U-shaped bottom piece forms a groove (11) running from one axial end to the other axial end which can hold the thin tapered optical-fiber coupler. The cover has the same width as the U-shaped bottom piece, but the cover's length is shorter. When the cover is centered on the U-shaped bottom piece, there remains an exposed portion of the groove in the U-shaped bottom piece on both sides of the cover. This exposed portion (14) starts at the edge of the cover and goes to longitudinal edge of the U-shaped bottom piece.

Figure 3:
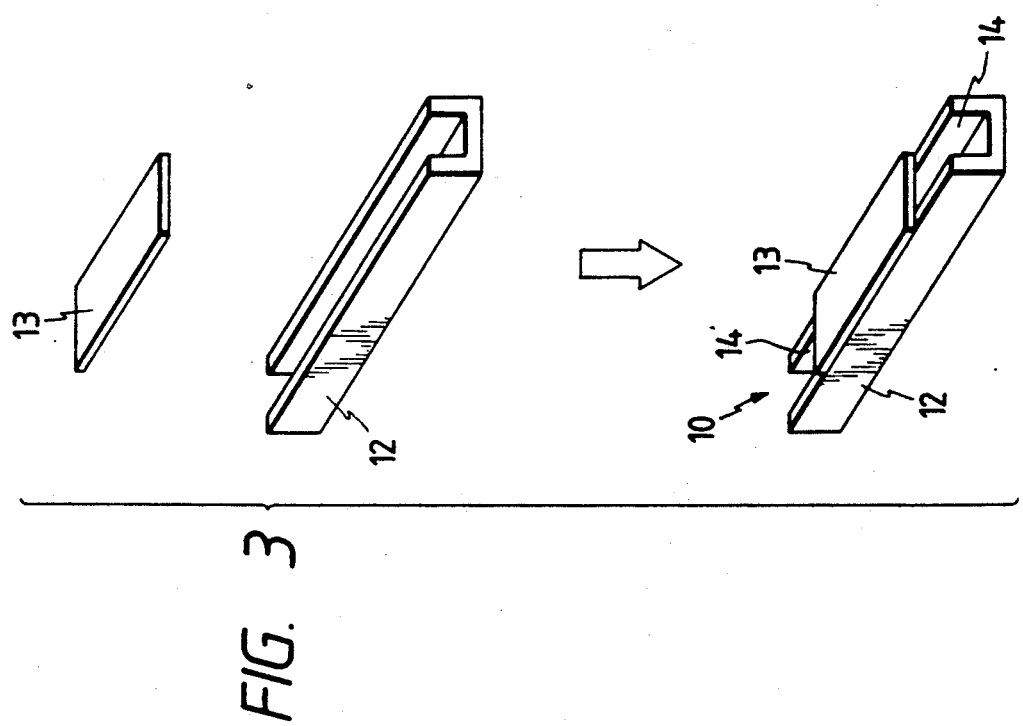
FIG. 3 is a schematic view of a reinforcing casing.

The reinforcing apparatus is manufactured so that, as shown in FIG. 3, a square bar having the groove (11) is used as the U-shaped bottom piece (12). A top plate which is used as the cover (13) has a length shorter than the length of the U-shaped bottom piece. The cover is centered on the U-shaped bottom piece and bonded with an adhesive. There are exposed portion of the groove which now exist.

To form the reinforcing apparatus according to the present invention, an optical-fiber (15) is inserted in the groove (11) of the U-shaped bottom piece (12). As can be seen in FIG. 1(b), the optical-fiber coupler (15) is made of three sections. The first section (15a) is the thin tapered portion of fused optical fibers. The second section (15b) is the optical fiber which has the coating removed. A second section (15b) lies on each sides of the fused optical fibers (15a). The third sections (15c) are coated optical fibers which are attached to the second section (15b). The U-shaped bottom piece must be long enough to contain all three sections of the optical fibers. The cover is long enough to enclose all of the fused optical fibers (15a) and a portion of the uncoated optical fibers (15b) on each side of the fused optical fibers. What remains exposed in the groove (11) after the cover is in place is a portion of the uncoated optical fibers (15b) and the coated optical fibers (15c) which extend beyond the longitudinal edges of the U-shaped bottom piece.

Figure 2:
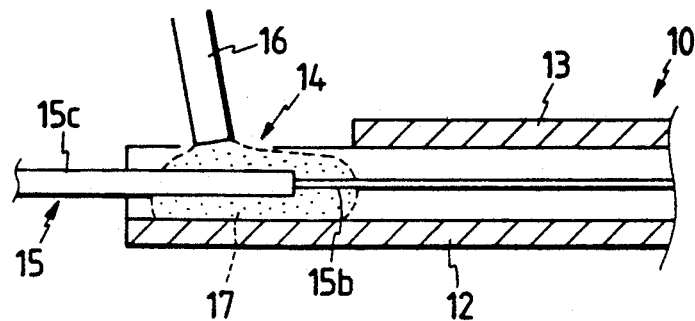
FIG. 2 is a view showing the mold work state of the reinforcing structure.

As shown in FIG. 2, an adhesive 17 is poured into the exposed portions (14) of the groove. The adhesive is directed into the groove by using a dispenser (16) or something similar. Once the adhesive is in place, the reinforcing structure (10) and the optical-fiber coupler (15) are bonded to each other. It is preferable to completely fill the exposed portions (14) with adhesive.

In this embodiment, the method of inserting the adhesive is easily performed due to the exposed portion (14) of the groove. Once the exposed portions (14) have been completely filled, the optical-fiber coupler is sealed from the environment. Therefore, dust and light which can interfere and affect the performance of the coupler have been eliminated.

Of course, the configuration of such a reinforcing casing is not limited only to the groove-formed square bar and the flat cover. It is possible to consider, for example, a circular bar worked to have a plane surface portion, a triangular bar, a pentagonal bar, a hexagonal bar, etc., and those bars having grooves therein.

Shapes as shown in FIGS. 4 through 9 can be provided by way of example as the other shapes of the reinforcing casing.

Figure 4:
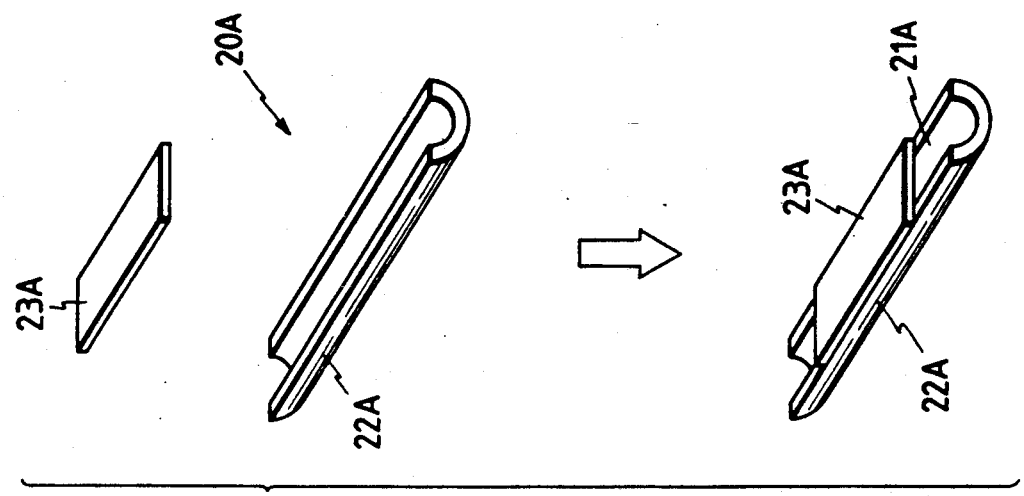
FIG. 4 is a schematic view of a reinforcing casing according to another embodiment of the present invention.

A reinforcing casing 20A shown in FIG. 4 is such that a top plate 23A is bonded with an adhesive to a member which is prepared by working a U-shaped circular bar 22A so as to have a semicircular groove 21A.

Figure 5:
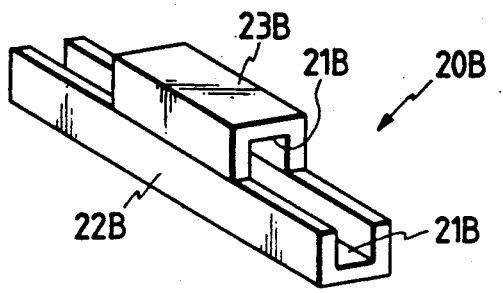
FIG. 5 is a schematic view of a reinforcing casing according to a third embodiment of the present invention.

A reinforcing casing 20B shown in FIG. 5 is such that groove-formed square bars 22B and 23B respectively having substantially channel-like sections so as to form grooves 21B and respectively having lengths different from each other are bonded to each other with an adhesive.

Figure 6:
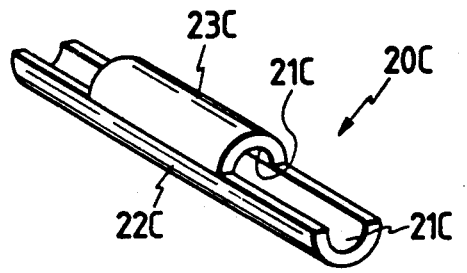
FIG. 6 is a schematic view of a reinforcing casing according to another embodiment of the present invention.

A reinforcing casing 20C shown in FIG. 6 is such that round bars 22C and 23C respectively having substantially U-shaped sections so as to form grooves 21B and respectively having lengths different from each other are bonded to each other with an adhesive.

Figure 7:
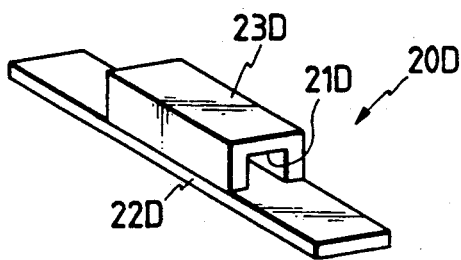
FIG. 7 is a schematic view of a reinforcing casing according to another embodiment of the present invention.

A reinforcing casing 20D shown in FIG. 7 is such that a casing member 23D which has a channel-like section, which is shorter than another elongated plate-like casing member 22D and which has a groove 21D is put so as to cover the upper surface of the other elongated plate-like casing member 22D and bonded to the latter with an adhesive.

Figure 8:
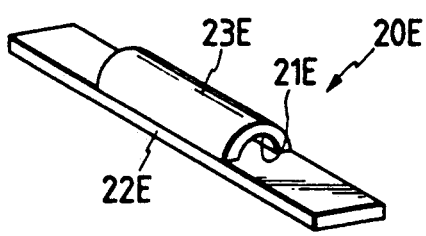
FIG. 8 is a schematic view of a reinforcing casing according to another embodiment of the present invention.

A reinforcing casing 20E shown in FIG. 8 is such that a casing member 23E which has a substantially U-shaped section, which is shorter than another elongated plate-like casing member 22E and which has a groove 21E is put so as to cover the upper surface of the other elongated plate-like casing member 22E and bonded to the latter with an adhesive.

Figure 9:
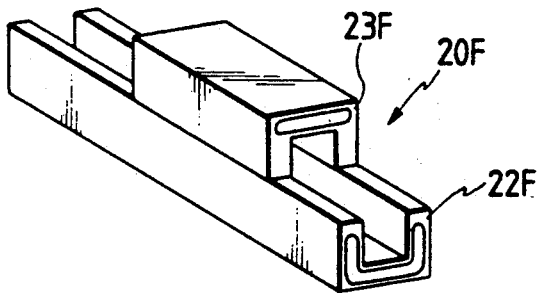
FIG. 9 is a schematic view of a reinforcing casing according to another embodiment of the present invention.

Further, it is unnecessary that the two members constituting each of the reinforcing casings are solid as described above. As shown in FIG. 9, members 22F and 23F molded so as to have hollow portions, that is, pipe-like members, may be bonded to each other with an adhesive so as to form a reinforcing casing 20F.

With respect to the reinforcing casings 20D and 20E shown in FIGS. 7 and 8, the adhesive used must have a viscosity which allows bonding to be performed after the viscosity of the adhesive has been adjusted.

Further, the quality of the material of the hollow casing is not specifically limited so long as the material has a certain extent of strength. Glass, plastics, ceramics, etc. may be used as the material. In consideration of thermal expansion, it is preferable to use a material having a linear expansion coefficient equal to the linear expansion coefficient of an optical fibers. For example, materials such as quartz are the most suitable. When cost of the reinforcing apparatus is a consideration, materials such as plastics or ceramics are advantageous.

Further, the adhesive according to the present invention is not specifically limited. There are various kinds of adhesives on the market which may be used, such as an ultraviolet-ray curable type, or a hot-melt type, or a thermal curable type, etc.

Figure 10:
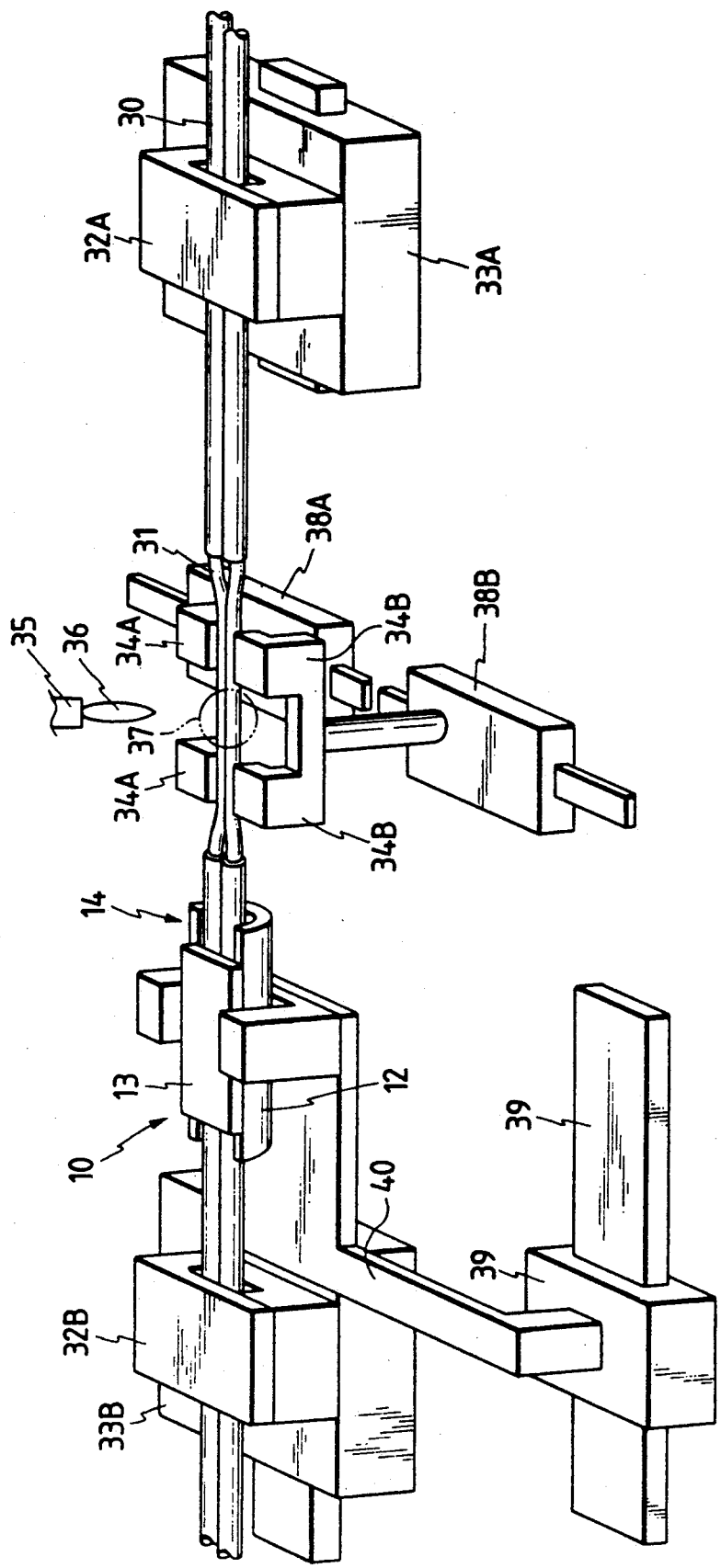
FIG. 10 is a perspective view showing a manufacturing example of the optical-fiber coupler using the reinforcing casing according to the present invention.
Figure 11:
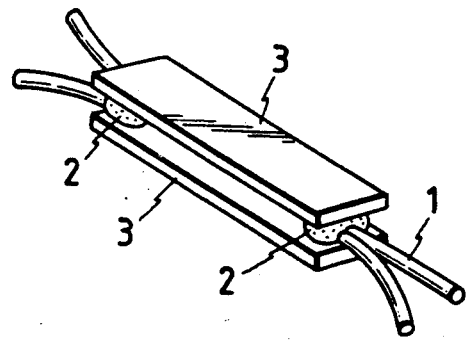
FIG. 11 is a perspective view showing a reinforcing structure according to the prior art.
Figure 12:
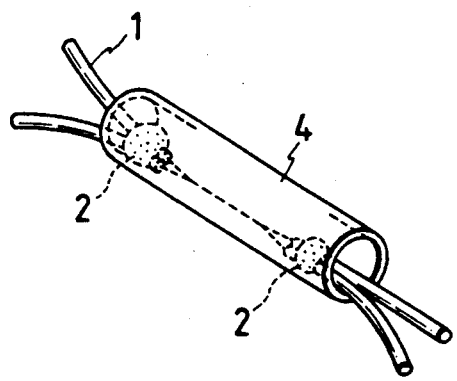
FIG. 12 is a perspective view showing a reinforcing structure according to the prior art.
Figure 13:
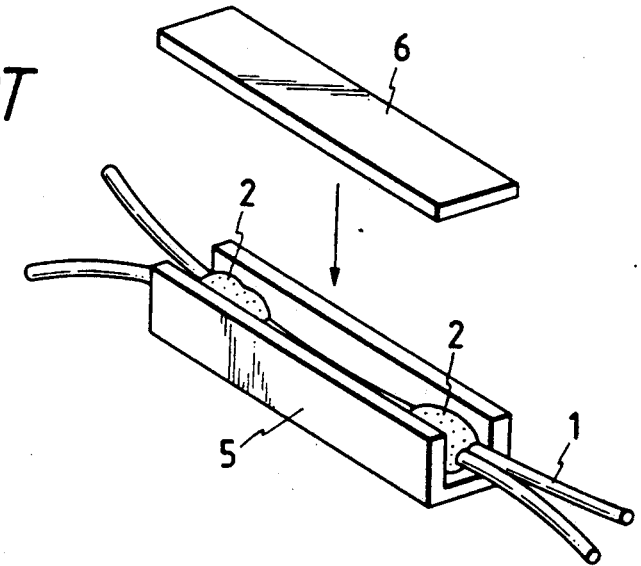
FIG. 13 is a perspective view showing a reinforcing structure according to the prior art.

FIG. 10 shows a more specific example of how to use the reinforcing apparatus in manufacturing a completed optical-fiber coupler.

As shown in the drawings, the coatings are removed from a middle portion of two fiber optical fibers (30) so that the glass portion (31) is exposed. After the two exposed glass portions (31) are passed through the reinforcing apparatus (10), the two fiber optical fibers are secured to extension stages (33A and 33B) by using optical fiber clamps (32A and 32B). Next, the exposed glass portion (31) are positioned so that they are touching by using glass portion clamps (34A and 34B). The central portions of the glass portions are fused together by using a flame (36) of a burner (35). After fusion of the glass portions is complete, the glass portion clamps (34A and 34B) are removed by moving glass portion clamp stages (38A and 38B). The central portion of the fused glass portions (37) is heated by the flame (36) again and simultaneously the optical fiber clamps (32A and 32B) are moved outwardly by extension stages (33A and 33B). The flame (36) is removed and a thin tapered portion of fused optical fibers is the optical-fiber coupler. The reinforcing apparatus (10) is mounted on a bracket (40) arranged so that it may move in the axial direction of the fiber by using a straight-moving stage (39). The stage is moved so that the central portion of the thin tapered fused glass portions is centered in the groove section of the reinforcing apparatus (10). Then, as shown in FIG. 2, the exposed groove portions (14) of the reinforcing apparatus (1) are molded with an adhesive (17) to thereby complete the reinforcing structure. As described above, the reinforcing structure according to the present invention can be formed through extremely simple work.

It should be understood that the foregoing relates to only preferred embodiments of the present invention, and that it is intended to cover all changes and modifications of the embodiment of the invention herein used for the purposes of disclosure, which do not institute departures from the spirit and scope of the invention.

What is claimed is:

1. A reinforcing apparatus for a fiber optic coupler with at least two ends comprising:
   a U-shaped base member having two axial open ends and a longitudinal groove between the two axial open ends; and
   a cover of a flat rectangular shape, having a width substantially equal to the width of the U-shaped base member and a length shorter than the longitudinal groove of the U-shaped base member, said cover being substantially centered on top of the U-shaped base member, said base member and cover being arranged such that coupled fiber optic cables can be disposed in said longitudinal groove so that the coupled portion of the optic coupler is disposed between said U-shaped member and said cover to protect the coupled portion.

2. A reinforcing apparatus according to claim 1, wherein an adhesive is injected into an exposed groove section on each side of the cover to tightly bond the U-shaped base member and the cover to the ends of the fiber optic coupler which are located in the longitudinal groove of the U-shaped base member.

3. A reinforcing apparatus according to claim 1, wherein the U-shaped base member and the cover are bonded to each other with an adhesive.

4. A reinforcing apparatus according to claim 1, wherein the U-shaped base member and the cover have a linear expansion coefficient equal to that of said fiber optic coupler.

5. A reinforcing apparatus according to claim 4, wherein the U-shaped base member and the cover are made of quartz.

6. A reinforcing apparatus according to claim 1, wherein the U-shaped base member is rectangular.

7. A reinforcing apparatus according to claim 1, wherein the U-shaped base member is semicircular.

8. A reinforcing apparatus according to claim 2, wherein the adhesive is of an ultraviolet curable type.

9. A reinforcing apparatus according to claim 2, wherein the adhesive is of a thermal curable type.

10. A reinforcing apparatus according to claim 2, wherein the adhesive is of a hot-melt type.

11. A reinforcing apparatus for a fiber optic coupler with at least two ends comprising:
    a U-shaped base member having two axial open ends and a longitudinal groove between the two axial open ends; and
    a U-shaped cover, having a width substantially equal to the width of the U-shaped base member and a length shorter than the longitudinal groove of the u-shaped base member, said cover being substantially centered on top of the U-shaped base member, said base member and cover being arranged such that coupled fiber optic cables can be disposed in said longitudinal groove so that the coupled portion of the optic coupler is disposed between said U-shaped base member and said U-shaped cover to protect the coupled portion.

12. A reinforcing apparatus according to claim 11, wherein an adhesive is injected into an exposed groove section on each side of U-shaped cover to tightly bond the U-shaped base member and the U-shaped cover to the ends of the fiber optic coupler which are located in the longitudinal groove of the U-shaped base member.

13. A reinforcing apparatus according to claim 11, wherein the U-shaped base member and the U-shaped cover are bonded to each other with an adhesive.

14. A reinforcing apparatus according to claim 11, wherein the U-shaped base member and the U-shaped cover have a linear expansion coefficient equal to that of said fiber optic coupler.

15. A reinforcing apparatus according to claim 14, wherein the U-shaped base member and the U-shaped cover are made of quartz.

16. A reinforcing apparatus according to claim 11, wherein the U-shaped base member and the U-shaped cover are rectangular.

17. A reinforcing apparatus according to claim 11, wherein the U-shaped base member and the U-shaped cover are semi-circular.

18. A reinforcing apparatus according to claim 12, wherein the adhesive is of an ultraviolet curable type.

19. A reinforcing apparatus according to claim 12, wherein the adhesive is of a thermal curable type.

20. A reinforcing apparatus according to claim 12, wherein the adhesive is of a hot-melt type.

21. A reinforcing apparatus for a fiber optic coupler with at least two ends comprising:
    a base of a flat rectangular shape; and
    a U-shaped cover having two axial open ends and a longitudinal groove between the two axial open ends, wherein the U-shaped cover has a width substantially equal to the width of the U-shaped base member and a longitudinal length shorter than the base is approximately centered on top of the base, said base member and cover being arranged such that coupled fiber optic cables can be disposed in said base so that the coupled portion of the optic coupler is disposed between said base and said U-shaped cover to protect the coupled portion.

22. An adhesive is injected into the open end on each side of U-shaped cover to tightly bond the base and the U-shaped cover to the ends of the fiber optic coupler, which are located in the longitudinal groove of the U-shaped cover.

23. A reinforcing apparatus according to claim 21, wherein the base and the U-shaped cover are bonded to each other with an adhesive.

24. A reinforcing apparatus according to claim 21, wherein the base and the U-shaped cover have a linear expansion coefficient equal to that of said fiber optic coupler.

25. A reinforcing apparatus according to claim 21, wherein the base and the U-shaped cover are made of quartz.

26. A reinforcing apparatus according to claim 21, wherein the U-shaped cover is rectangular.

27. A reinforcing apparatus according to claim 21, wherein the U-shaped cover is semicircular.

28. A reinforcing apparatus according to claim 22, wherein the adhesive is of an ultraviolet curable type.

29. A reinforcing apparatus according to claim 22, wherein the adhesive is of a thermal curable type.

30. A reinforcing apparatus according to claim 22, wherein the adhesive is of a hot-melt type.

* * * * *